(12) United States Patent
Freeman et al.

(10) Patent No.: US 10,180,071 B2
(45) Date of Patent: Jan. 15, 2019

(54) COMPOSITE BLADES FOR GAS TURBINE ENGINES

(71) Applicant: Rolls-Royce North American Technologies, Inc., Indianapolis, IN (US)

(72) Inventors: Ted J. Freeman, Danville, IN (US); Daniel K. Vetters, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 448 days.

(21) Appl. No.: 14/968,199

(22) Filed: Dec. 14, 2015

(65) Prior Publication Data

US 2016/0146021 A1   May 26, 2016

Related U.S. Application Data

(60) Provisional application No. 62/082,359, filed on Nov. 20, 2014.

(51) Int. Cl.
| | | |
|---|---|---|
| *F01D 5/28* | (2006.01) | |
| *F01D 5/18* | (2006.01) | |
| *F01D 5/30* | (2006.01) | |

(52) U.S. Cl.
CPC ............. *F01D 5/284* (2013.01); *F01D 5/18* (2013.01); *F01D 5/282* (2013.01); *F01D 5/3007* (2013.01);
(Continued)

(58) Field of Classification Search
CPC ..... B29D 99/0025; B29C 70/42; B29C 70/24; B29L 2031/082; F01D 5/147; F01D 5/30; F01D 5/3007; F01D 5/3084; F01D 5/284; F01D 5/282; F01D 5/18; F05D 2240/30; F05D 2220/30; F05D 2220/32; F05D 2230/31; F05D 2230/23; F05D 2230/60;
(Continued)

(56) References Cited

U.S. PATENT DOCUMENTS

| | | | |
|---|---|---|---|
| 3,731,360 A | 5/1973 | Stone | |
| 4,417,854 A * | 11/1983 | Cain | F01D 5/284 |
| | | | 416/219 R |

(Continued)

FOREIGN PATENT DOCUMENTS

| | | |
|---|---|---|
| DE | 3235230 A1 | 3/1984 |
| EP | 2363574 A2 | 9/2011 |

(Continued)

OTHER PUBLICATIONS

Extended European Search Report, European Application No. 17168044.0-1610, dated Sep. 29, 2017, 6 pages.
(Continued)

*Primary Examiner* — Dwayne J White
*Assistant Examiner* — Adam W Brown
(74) *Attorney, Agent, or Firm* — Barnes & Thornburg LLP (57) ABSTRACT

A turbine wheel for use in a gas turbine engine having a plurality of blades attached to a rotor disk. Each blade is formed as a composite structure including a number of plies of ceramic-containing material. The blades each include a root to fit within dovetail slots of the rotor disk to couple the blades to the rotor disk.

19 Claims, 6 Drawing Sheets

(52) U.S. Cl.
CPC ...... *F05D 2220/32* (2013.01); *F05D 2230/23* (2013.01); *F05D 2230/60* (2013.01); *F05D 2240/30* (2013.01); *F05D 2260/20* (2013.01); *F05D 2300/6033* (2013.01); *Y02T 50/672* (2013.01); *Y02T 50/673* (2013.01)

(58) Field of Classification Search
CPC ....... F05D 2300/603; F05D 2300/6033; F05D 2260/20; D03D 25/005; Y02T 50/673; Y02T 50/672
See application file for complete search history.

(56) References Cited

U.S. PATENT DOCUMENTS

| | | | |
|---|---|---|---|
| 5,018,271 A | | 5/1991 | Bailey et al. |
| 5,049,036 A | | 9/1991 | Bailey et al. |
| 5,308,228 A | | 5/1994 | Benoit et al. |
| 5,340,280 A | | 8/1994 | Schilling et al. |
| 5,403,153 A | * | 4/1995 | Goetze ................... B29C 70/86 |
| | | | 416/229 A |
| 5,573,377 A | * | 11/1996 | Bond ...................... F01D 5/147 |
| | | | 416/219 R |
| 6,290,895 B1 | * | 9/2001 | Wang ................... B29C 70/342 |
| | | | 264/258 |
| 6,857,856 B2 | | 2/2005 | Potter |
| 7,300,255 B2 | | 11/2007 | Potter et al. |
| 7,329,101 B2 | * | 2/2008 | Carper .................. C04B 35/565 |
| | | | 416/219 R |
| 8,206,118 B2 | | 6/2012 | Propheter-Hinckley et al. |
| 8,430,623 B2 | * | 4/2013 | Beckford .................. F01D 5/14 |
| | | | 415/9 |
| 8,568,082 B2 | * | 10/2013 | Beckford ................ F01D 5/147 |
| | | | 415/9 |
| 8,777,583 B2 | | 7/2014 | Darkins, Jr. et al. |
| 8,834,125 B2 | | 9/2014 | Alvanos et al. |
| 2004/0062655 A1 | | 4/2004 | Potter et al. |
| 2013/0243604 A1 | | 9/2013 | Roussille et al. |
| 2014/0154073 A1 | | 6/2014 | Cairo et al. |

FOREIGN PATENT DOCUMENTS

| | | |
|---|---|---|
| EP | 2392778 A2 | 12/2011 |
| FR | 2538029 A1 | 6/1984 |
| WO | 2014163709 A2 | 10/2014 |

OTHER PUBLICATIONS

Extended European Search Report, European Application No. 15193997.2-1610, dated May 3, 2016, 6 pages.

* cited by examiner

COMPOSITE BLADES FOR GAS TURBINE ENGINES

CROSS REFERENCE TO RELATED APPLICATIONS

This application claims priority to and the benefit of U.S. Provisional Patent Application No. 62/082,359, filed 20 Nov. 2014, the disclosure of which is now expressly incorporated herein by reference.

FIELD OF THE DISCLOSURE

The present disclosure relates generally to gas turbine engines, and more specifically to composite blade attachment.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include blades made from ceramic-matrix composite materials that are able to interact with the hot combustion products. In some turbine wheels, the blades may be coupled to a metallic disk that supports the blades in a gas path leading out of the combustor. Coupling of the blades made from ceramic-matrix composite materials with metallic disks can present design challenges.

SUMMARY

The present disclosure may comprise one or more of the following features and combinations thereof.

A turbine wheel for a gas turbine engine may include a disk and a blade. The disk may be formed to include a dovetail slot that extends through the disk in an axial direction from a forward side to an aft side of the disk and inwardly in a radial direction from an outer diameter of the disk toward a central axis. The blade may comprise ceramic-matrix materials. The blade may be formed to include an airfoil that extends outwardly in the radial direction from the outer diameter of the disk and a root that extends into the dovetail slot.

In illustrative embodiments, the root may include a stem that extends from the airfoil into the dovetail slot, a root core, and a root casing that extends from the stem around the root core to couple the root core to the stem. The root casing may comprise ceramic-matrix materials and may be positioned to engage an inner surface of the dovetail slot formed by the disk to retain the blade in place relative to the disk during rotation of the disk.

In illustrative embodiments, the dovetail slot may include a pair of blocker walls defining a radially-facing opening extending through the outer diameter of the disk into the dovetail slot and the inner surface. The inner surface may connect the blocker walls.

In illustrative embodiments, the root of the blade may have a substantially cylindrical outer profile. The inner surface of the dovetail slot may substantially match the outer profile of the root.

In illustrative embodiments, the root of the blade may have a substantially pentagonal outer profile. The inner surface of the dovetail slot may substantially match the outer profile of the root.

In illustrative embodiments, portions of the airfoil and root may be formed by at least one continuous ply of ceramic-containing material. In some embodiments, the at least one continuous ply of ceramic-containing material may include a first end and a second end. The continuous ply of ceramic-containing material may form at least part of the airfoil and at least part of the root by extending radially inward from the first end, wrapping around the root core, and extending along itself back radially outward to the second end such that the first and second ends are adjacent to one another.

In illustrative embodiments, the blade may include a cooling channel. The cooling channel may extend from the root core radially outward through the airfoil such that at least a portion of the airfoil is hollow to allow cooling air to pass through the root core, through the blade, and out of a tip of the airfoil.

According to another aspect of the present disclosure, a turbine wheel for a gas turbine engine may include a disk and a blade. The disk may be formed to include a dovetail slot that extends through the disk in an axial direction from a forward side to an aft side of the disk and inwardly in a radial direction from an outer diameter of the disk toward a central axis. The blade may be formed to include an airfoil that extends outwardly in the radial direction from the outer diameter of the disk and a root that extends into the dovetail slot. The airfoil and root may be formed as a composite structure.

In illustrative embodiments, the root may include a stem that extends from the airfoil into the dovetail slot, a root core comprising ceramic-matrix material, and a root casing that extends from the stem around the root core to couple the root core to the stem. The root casing may comprise ceramic-matrix materials and may be positioned to engage an inner surface of the dovetail slot formed by the disk to retain the blade in place relative to the disk during rotation of the disk. In some embodiments, the root core may include at least one tube formed from woven ceramic-containing fibers without an axially extending seam.

In illustrative embodiments, the root core may include a filler. The filler may be positioned within the at least one tube.

In illustrative embodiments, the filler may comprise a plurality of ceramic-containing fibers. The fibers may be aligned with one another along a length of the one or more tubes and suspended in a ceramic matrix material.

In illustrative embodiments, the filler may comprise a ply of ceramic-containing material. The ply of ceramic-containing material ay be continuously rolled onto itself to form a cylinder of ceramic-containing material.

In some embodiments, the filler may comprise an infiltrated foam. The infiltrated foam may be ceramic foam.

In illustrative embodiments, at least one continuous ply of ceramic-containing material may include a first end and a second end. The continuous ply of ceramic-containing material may form at least part of the airfoil and at least part of the root by extending radially inward from the first end, wrapping around the root core, and extending along itself back radially outward to the second end such that the first and second ends are adjacent to one another.

In illustrative embodiments, the blade may include a cooling channel positioned between the first and second ends of the at least one continuous ply. The cooling channel may extend from the root core radially outward through the airfoil such that at least a portion of the airfoil is hollow to allow cooling air to pass through the root core, through the blade, and out of a tip of the airfoil.

In illustrative embodiments, the blade may be formed to include at least one aperture formed through the one or more tubes forming the root core. The at least one aperture may extend from a hollow interior of the one or more tubes to the cooling channel.

In illustrative embodiments, the blade may include ports formed through the root casing and root core. The ports may extend from an exterior of the root casing to the hollow interior of the one or more tubes forming the root core.

In illustrative embodiments, the blade may include one or more spacers. The spacers may be positioned between the first and second ends of the at least one continuous ply of ceramic-containing material. In some embodiments, the one or more spacers may comprise reticulated ceramic foam.

According to another aspect of the present disclosure, a method of making a turbine wheel is taught. The method may include positioning a root of a composite blade in a dovetail slot of a rotor disk such that a root casing of the root is positioned to engage an inner surface of the dovetail slot formed by the disk to retain the blade in place relative to the disk during rotation of the disk.

In illustrative embodiments, the root may include a stem that extends from the airfoil into the dovetail slot, a root core, and the root casing. The root casing may comprise ceramic-matrix materials and may extend from the stem around the root core to couple the root core to the stem.

In illustrative embodiments, the method may include forming the composite blade by bonding together plies of ceramic-containing material into a ceramic structure. The root core may include at least one tube formed from at least one of the plies. At least one of the other plies may form at least part of the airfoil and at least part of the root casing by extending radially inward from a first end, wrapping around the root core, and extending along itself back radially outward to a second end such that the first and second ends are adjacent to one another.

In illustrative embodiments, the method may include positioning a filler within the at least one tube formed from at least one of the plies. The filler may comprise (i) one of a plurality of ceramic-containing fibers aligned with one another along a length of the at least one tube and suspended in a ceramic matrix material or (ii) a ply of ceramic-containing material continuously rolled onto itself to form a cylinder of ceramic-containing material.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
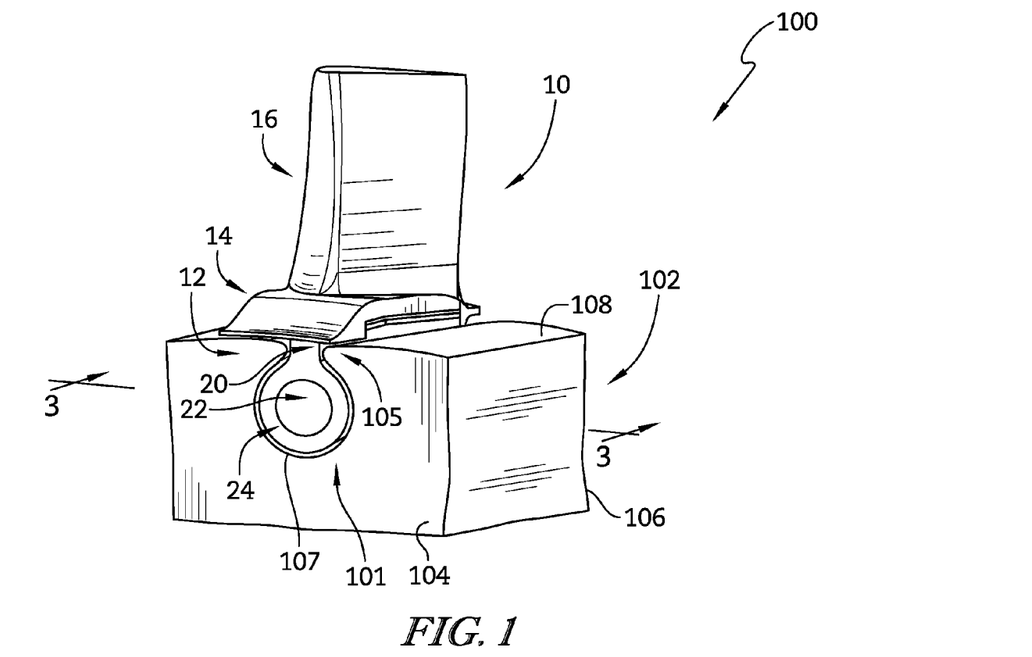
FIG. 1 is a partial perspective view of a turbine wheel adapted for use in a gas turbine engine showing that the turbine wheel includes a first embodiment of a blade in accordance with the present disclosure and a rotor disk having a dovetail slot sized to receive a root of the blade.
Figure 2:
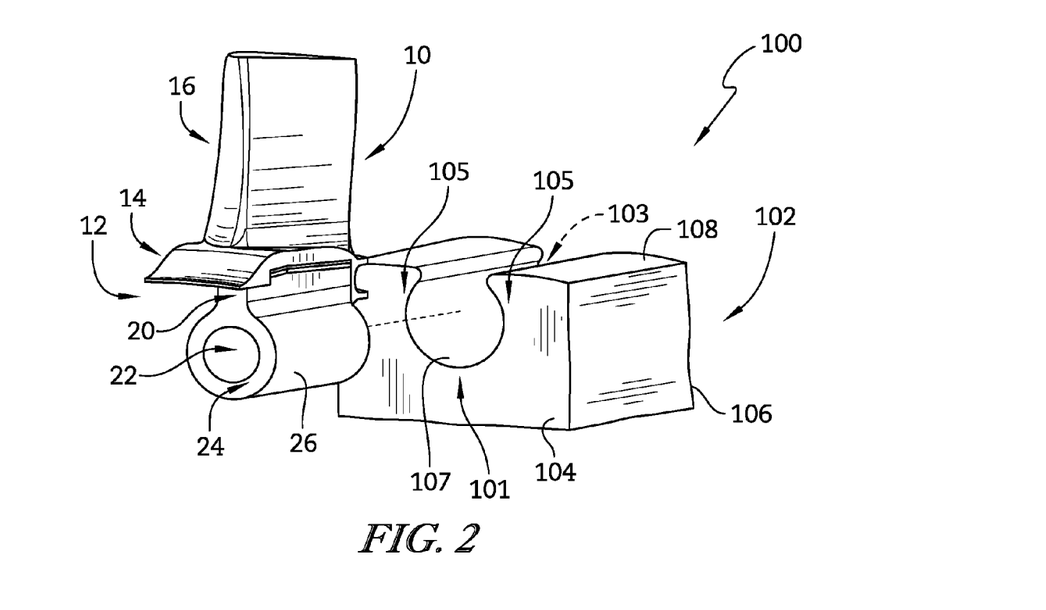
FIG. 2 is an exploded assembly view of the turbine wheel of FIG. 1 showing that the blade includes an airfoil, a platform, and the root for attaching the blade to the rotor disk and suggesting that the root may incorporate material used to form the platform, airfoil, or both as shown in FIG. 3.

An illustrative turbine wheel 100 adapted for use in a gas turbine engine is shown in FIGS. 1 and 2. The turbine wheel 100 includes a rotor disk 102 (only a portion of which is shown) and a plurality of turbine blades 10 (only one of which is shown). In accordance with the present disclosure, the turbine blades 10 are attached to the rotor disk 102 for rotation with the rotor disk 102 about a central axis of the gas turbine engine.

The rotor disk 102 is illustratively made from a metallic superalloy (e.g. INCONEL, WASPALOY, etc.) and includes a forward side 104 facing toward a front of the gas turbine engine, an aft side 106 facing toward a rear of the engine, and a radial surface 108 defining an outer diameter of the rotor disk 102 as shown in FIGS. 1 and 2. The rotor disk 102 is additionally formed to include a plurality of dovetail slots 101 (only one of which is shown) formed in the rotor disk 102. In other embodiments, the rotor disk may be made from other metallic or non-metallic materials.

Each dovetail slot 101 extends inwardly in the radial direction from the radial surface 108 of the rotor disk 102 as shown in FIG. 2. Further, each dovetail slot 101 extends through the rotor disk 102 from the forward side 104 to the aft side 106 and is shaped to form a dovetail shape when viewed from the front or aft sides 104, 106. In the illustrative embodiment, the dovetail shape is substantially cylindrical to surround a root 12 of the blade 10 while minimizing space for the root 12 to travel in the dovetail slot 101. The dovetail slots 101 are positioned to couple the plurality of blades 10 to the rotor disk 102 to form the turbine wheel 100.

Cover plates may be coupled to the rotor disk 102 on the forward and aft sides of the dovetail slot 101 to assist in retaining the blade within the dovetail slot 101. The cover plates may be attached by various methods including, but not limited to, welding or brazing, adhesives, or mechanical fasteners to name a few.

Each blade 10 of the exemplary embodiment is made from a ceramic-matrix composite material adapted to withstand high temperature combustion products discharged onto the blade 10. The blades 10 illustratively comprise silicon-carbide reinforcements suspended in silicon-carbide matrix material. In other embodiments, other reinforcements and other ceramic-containing matrix materials may be included in the blades 10.

Each blade 10 is formed to include a root 12, a platform 14 coupled to the root 12, and an airfoil 16 coupled to the platform 14 as shown, for example, in FIG. 2. The airfoil 16 is aerodynamically shaped to interact with gasses moving over the blade 10. The platform 14 connects the root 12 to the airfoil 16 and separates the root 12 from the airfoil 16 so that gasses passing over the airfoil 16 are blocked from moving down around the root 12 as suggested in FIG. 1. In some embodiments, the platform is formed separately from the blade and positioned to surround at least a portion of the blade to block gasses from moving down to the root.

In the illustrative embodiment, the root 12 includes a stem 20 which extends down from the airfoil 16 and the platform 14, a root core 22, and a root casing 24 surrounding the root core 22 and coupled to the stem 20 as shown in FIG. 2. The stem 20 is sized to be received in a radially-facing opening 103 of the dovetail slot 101 such that the root 12 can pass into the dovetail slot 101 as shown in FIG. 1. Similarly, the root core 22 and root casing 24 are sized to be received in the dovetail slot 101.

Figure 3:
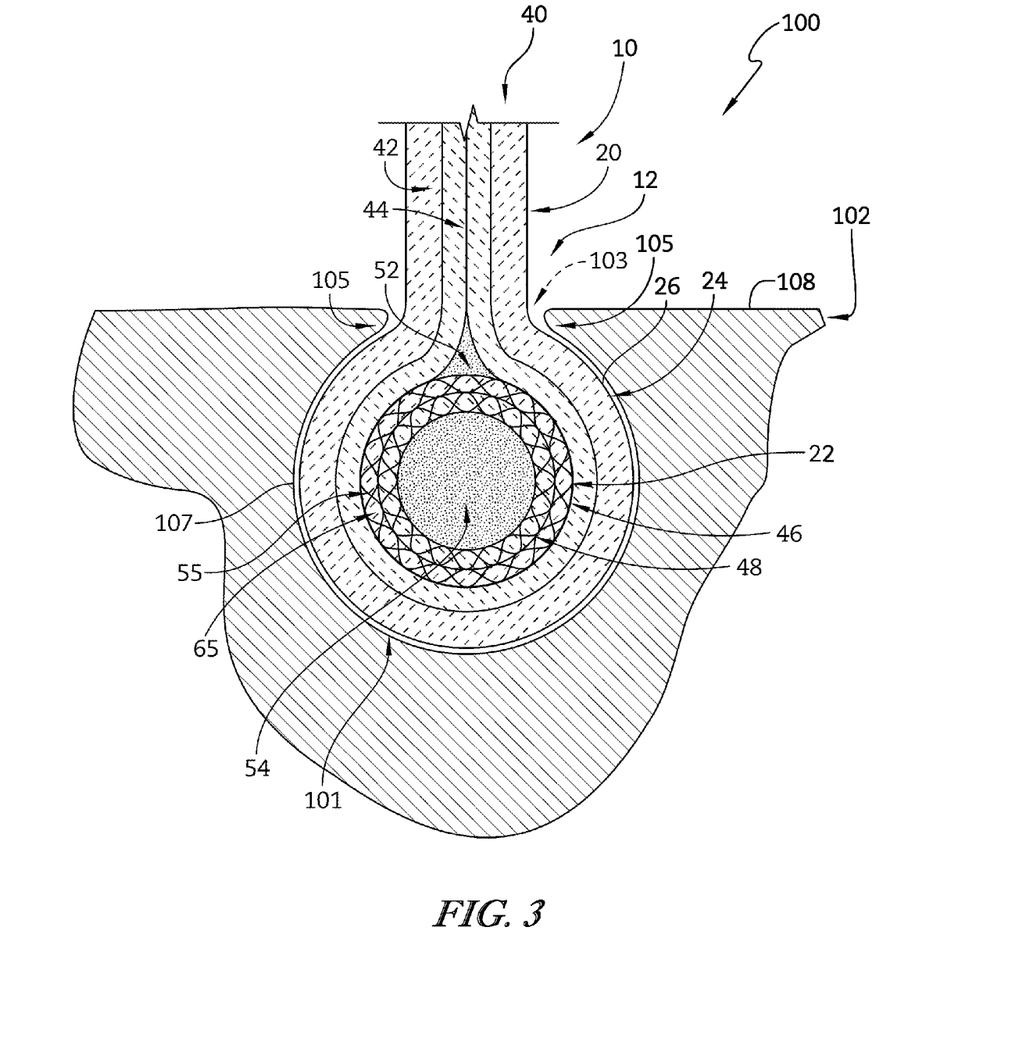
FIG. 3 is a cross-sectional view of the turbine wheel of FIG. 1 showing that one or more plies of ceramic-containing materials extend down from the platform, airfoil, or both and wrap around a cylindrical root core and suggesting that the root core includes one or more tubes of ceramic-containing materials and a filler positioned within the tubes.

The root core 22 and root casing 24 are substantially cylindrical as shown in FIGS. 2 and 3. However, in other embodiments, the root core and root casing may have other shapes. In the illustrative embodiment, the root casing 24 includes ceramic fiber reinforcements 55 woven or braided to form a tube without an axially extending seam and are suspended in a ceramic matrix material 65.

The dovetail slot 101 of the rotor disk 102 illustratively includes a pair of converging blocker walls 105 forming the radially-facing opening 103 and a rounded inner surface 107 connecting the blocker walls 105. The blocker walls 105 are positioned to engage the root casing 24 to retain the root 12 of the blade 10 within the slot 101 as suggested in FIG. 1. The rounded inner surface 107 is sized and shaped to surround the root core 22 and root casing 24. The rounded inner surface 107 may substantially match the outer profile of the root casing 24 in order to assist in retaining the root 12 within the slot 101.

In the illustrative embodiment, the root 12 passes into the dovetail slot 101 of the rotor disk 102 through either the forward or aft end of the dovetail slot 101 as suggested in FIG. 2. An outer surface 26 of the root casing 24 contacts the blocker walls 105 of the dovetail slot 101 to counteract centrifugal forces exerted on the blade 10 during operation of the gas turbine engine as suggested in FIG. 3. In one illustrative embodiment, the blade 10 is formed from a plurality of plies of ceramic-containing material bonded together with a ceramic matrix material in a composite structure. For example, each ply contains fibers of ceramic material woven together or otherwise arranged to form a sheet.

The plies may be flexible prior to forming the composite structure so that they can be arranged in a mold defining the general shape of the blade 10 and bonded together with the ceramic matrix material that infiltrates the plies and is densified. The bonding process fixes the shape of the plies to form the composite structure. Subsequent machining or processing may occur to refine the shape of the composite structure.

In the illustrative embodiment, two plies 42, 44 form the root casing 24 and at least a portion of the stem 20 while two plies 46, 48 form at least a portion of the root core 22 as suggested in FIG. 3. The plies 42, 44, 46, 48 are bonded together to form a composite structure 40. Although four plies are shown, more or less plies may be used without departing from the teachings of the present disclosure.

The piles 42, 44 may be continuous sheets that extend down from the platform 14 of the blade 10, wrap around the root core 22, and extend along themselves back out to the platform 14 to form the stem 20 as suggested in FIG. 3. The plies 42, 44 may additionally form portions of the platform 14, airfoil 16, or both. An optional wedge 52 may be added between the root core 22 and mating portions of the plies 42, 44. In the illustrative embodiment, the wedge 52 is formed from chopped or segmented fibers of ceramic material suspended in a ceramic matrix material.

The plies 46, 48 are arranged in a rounded tube shape to form the root core 22 as suggested in FIG. 3. In one embodiment, the plies 46, 48 are rolled sheets with the ply 46 rolled around the ply 48. In another embodiment, the plies 46, 48 are formed as braided tubes where fibers of ceramic material are woven together into the tube shape. An optional filler 54 may be added to the center of the root core 22.

In the illustrative embodiment, the filler 54 is formed from strands of ceramic-containing material aligned to extend along a length of the tubes and suspended in a ceramic matrix material as suggested in FIG. 3. In another embodiment, the filler 54 may be chopped or segmented fibers of ceramic material suspended in a ceramic matrix material. In another embodiment, the filler 54 may be an additional ply of ceramic-containing material continuously rolled onto itself to form a cylinder of ceramic-containing material (sometimes called a jelly roll) and then positioned within the tubes formed by the plies 46, 48. The additional ply may be bonded with the plies 42, 44, 46, 48 to form part of the composite structure 40.

In another embodiment, the filler 54 may be a monolithic ceramic component. In another embodiment, the filler 54 may comprise fibers of ceramic-containing material woven together to form a 3-dimensional structure, such as, for example, a cylinder. In another embodiment, the filler 54 may be a fully processed ceramic-matrix composite structure. In another embodiment, the filler 54 may comprise ceramic foam that is infiltrated. In another embodiment, the root core 22 may consist solely of the filler 54 in any of the above described alternative forms.

The blade 10 experiences centrifugal loading during rotation of the turbine wheel 100 as suggested in FIG. 3. The forces are distributed through the stem 20 and to the root casing 24. The outer surface 26 of the root casing 24 contacts the blocker walls 105 of the dovetail slot 101 to resist the forces acting on the blade 10 and maintain positioning of the root 12 within the dovetail slot 101. The forces placed on the root casing 24 are transferred at least in part to the root core 22. The tubes formed by the plies 46, 48 distribute the load as hoop stress around the circumference of the tubes to maintain the shape of the root 12.

Figure 4:
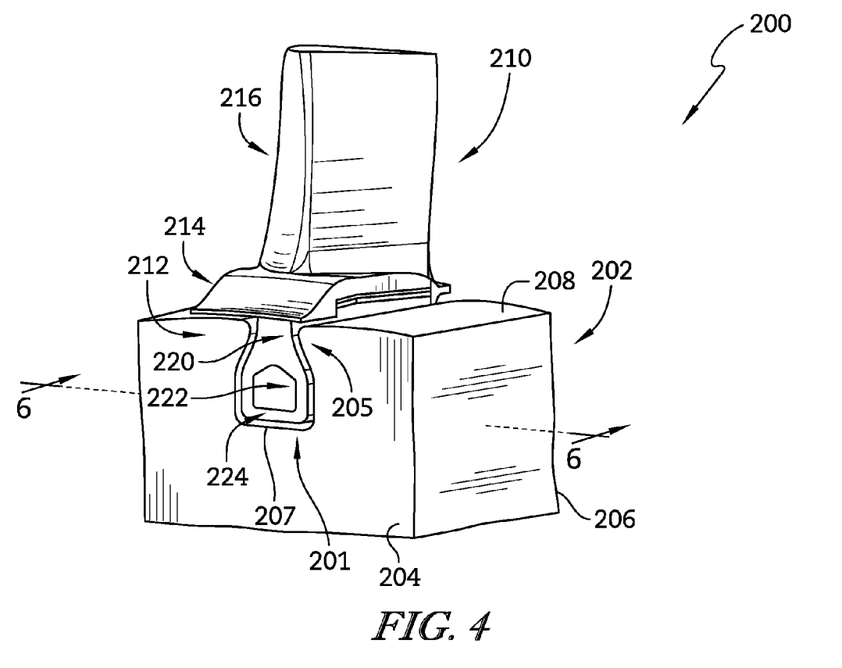
FIG. 4 is a partial perspective view of a second turbine wheel adapted for use in a gas turbine engine showing that the turbine wheel includes a second embodiment of a blade in accordance with the present disclosure and a rotor disk having a dovetail slot sized to receive a root of the blade.
Figure 5:
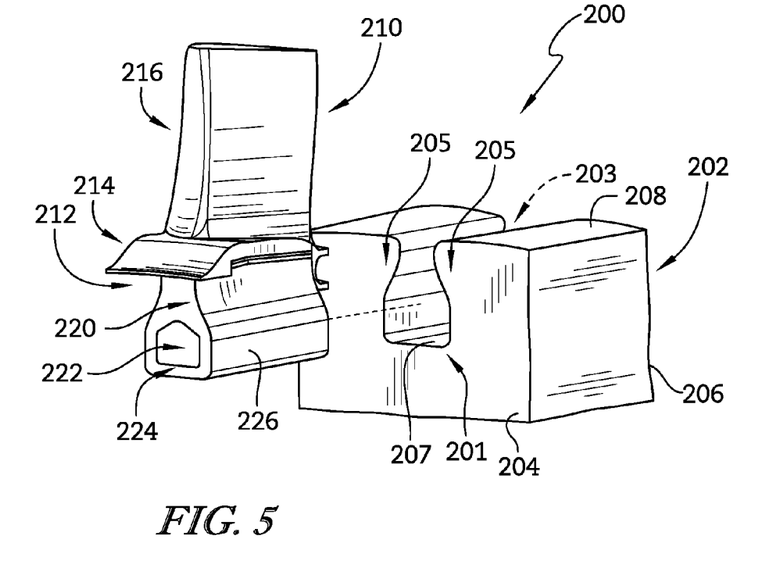
FIG. 5 is an exploded assembly view of the turbine wheel of FIG. 4 showing that the blade includes an airfoil, a platform, and the root for attaching the blade to the rotor disk and suggesting that the root may incorporate material used to form the platform, airfoil, or both as shown in FIG. 6.

Another illustrative turbine wheel 200 adapted for use in a gas turbine engine is shown in FIGS. 4 and 5. The turbine wheel 200 includes a rotor disk 202 (only a portion of which is shown) and a plurality of turbine blades 210 (only one of which is shown). In accordance with the present disclosure, the turbine blades 210 are attached to the rotor disk 202 for rotation with the rotor disk 202 about a central axis of the gas turbine engine. The rotor disk 202 is similar to the rotor disk 102.

The rotor disk 202 illustratively includes a forward side 204 facing toward a front of the gas turbine engine, an aft side 206 facing toward a rear of the engine, and a radial surface 208 defining an outer diameter of the rotor disk 202 as shown in FIGS. 4 and 5. The rotor disk 202 is additionally formed to include a plurality of dovetail slots 201 (only one of which is shown) formed in the rotor disk 202.

Each dovetail slot 201 extends inwardly in the radial direction from the radial surface 208 of the rotor disk 202 as shown in FIG. 5. Further, each dovetail slot 201 extends through the rotor disk 202 from the forward side 204 to the aft side 206 and is shaped to form a dovetail shape when viewed from the front or aft sides 204, 206. In the illustrative embodiment, the dovetail shape is substantially pentagonal to surround a root 212 of the blade 210 while minimizing space for the root 212 to travel in the dovetail slot 201. The dovetail slots 201 are positioned to couple the plurality of blades 210 to the rotor disk 202 to form the turbine wheel 200.

Each blade 210 of the exemplary embodiment is made from a ceramic-matrix composite material adapted to withstand high temperature combustion products discharged onto the blade 210. The blades 210 illustratively comprise silicon-carbide reinforcements suspended in silicon-carbide matrix material. In other embodiments, other reinforcements and other ceramic-containing matrix materials may be included in the blades 210.

Each blade 210 is formed to include a root 212, a platform 214 coupled to the root 212, and an airfoil 216 coupled to the platform 214 as shown, for example, in FIG. 5. The airfoil 216 is aerodynamically shaped to interact with gasses moving over the blade 210. The platform 214 connects the root 212 to the airfoil 216 and separates the root 212 from the airfoil 216 so that gasses passing over the airfoil 216 are blocked from moving down around the root 212 as suggested in FIG. 4. In some embodiments, the platform is formed separately from the blade and positioned to surround at least a portion of the blade to block gasses from moving down to the root.

In the illustrative embodiment, the root 212 includes a stem 220 which extends down from the airfoil 216 and the platform 214, a root core 222, and a root casing 224 surrounding the root core 222 and coupled to the stem 220 as shown in FIG. 5. The stem 220 is sized to be received in a radially-facing opening 203 of the dovetail slot 201 such that the root 212 can pass into the dovetail slot 201 as shown in FIG. 4. Similarly, the root core 222 and root casing 224 are sized to be received in the dovetail slot 201.

The root core 222 and root casing 224 are substantially pentagonal as shown in FIGS. 4 and 5. However, in other embodiments, the root core and root casing may have other shapes. In the illustrative embodiment, the root casing 224 includes ceramic fiber reinforcements 255 woven or braided to form a tube without an axially extending seam and are suspended in a ceramic matrix material 265.

The dovetail slot 201 of the rotor disk 202 illustratively includes a pair of converging blocker walls 205 forming the radially-facing opening 203 and an inner surface 207 connecting the blocker walls 205. The blocker walls 205 are positioned to engage the root casing 224 to retain the root 212 of the blade 210 within the slot 201 as suggested in FIG. 4. The inner surface 207 is sized and shaped to surround the root core 222 and root casing 224. The inner surface 207 may substantially match the outer profile of the root casing 224 in order to assist in retaining the root 212 within the slot 201.

In the illustrative embodiment, the root 212 passes into the dovetail slot 201 of the rotor disk 202 through either the forward or aft end of the dovetail slot 201 as suggested in FIG. 5. An outer surface 226 of the root casing 224 contacts the blocker walls 205 of the dovetail slot 201 to counteract centrifugal forces exerted on the blade 210 during operation of the gas turbine engine as suggested in FIG. 6. In one illustrative embodiment, the blade 210 is formed from a plurality of plies of ceramic-containing material bonded together with a ceramic matrix material in a composite structure. For example, each ply contains fibers of ceramic material woven together or otherwise arranged to form a sheet.

The plies may be flexible prior to forming the composite structure so that they can be arranged in a mold defining the general shape of the blade 210 and bonded together with the ceramic matrix material that infiltrates the plies and is densified. The bonding process fixes the shape of the plies to form the composite structure. Subsequent machining or processing may occur to refine the shape of the composite structure.

Figures 6, 7:
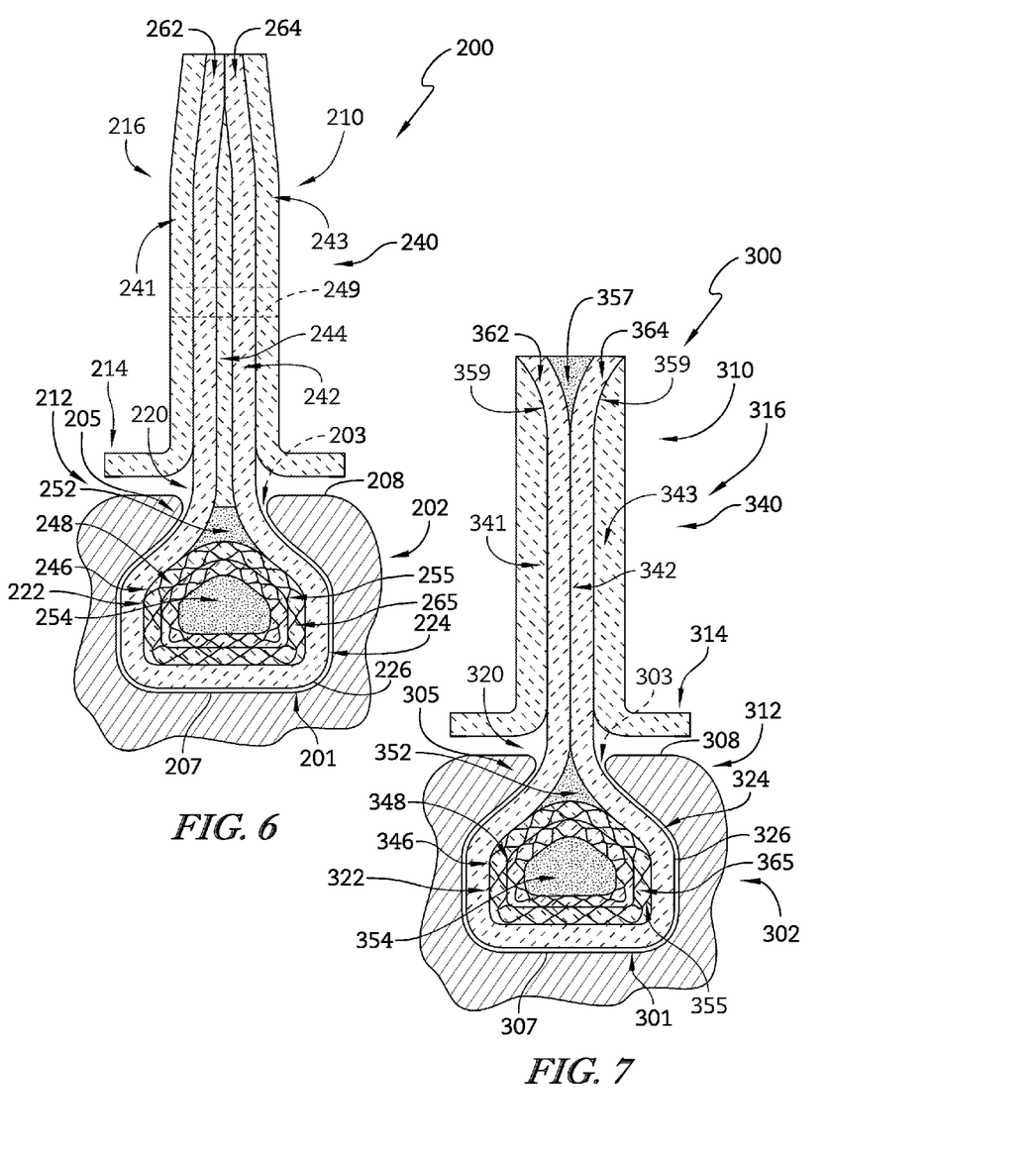
FIG. 6 is a cross-sectional view of the turbine wheel of FIG. 4 showing that one or more plies of ceramic-containing materials extend down from the platform, airfoil, or both and wrap around a pentagonal root core and suggesting that the root core includes one or more tubes of ceramic-containing materials and a filler positioned within the tubes.
FIG. 7 is a cross-sectional view of a third turbine wheel showing that a third embodiment of a blade in accordance with the present disclosure includes an airfoil, a platform, and a root for attaching the blade to a rotor disk and suggesting that plies of ceramic-containing materials forming a portion of the airfoil and platform are coupled to plies of ceramic-containing materials forming a portion of the root and are held against centrifugal forces acting on the blade during operation of the gas turbine engine at least in part by a wedge positioned at a distal tip of the airfoil.

In the illustrative embodiment, a ply 242 forms the root casing 224 and at least a portion of the stem 220 while two plies 246, 248 form at least a portion of the root core 222 as suggested in FIG. 6. The plies 242, 246, 248 are bonded together to form a composite structure 240. Although three plies are shown, more or less plies may be used without departing from the teachings of the present disclosure.

The ply 242 may be a continuous sheet having a first end 262 and a second end 264 as suggested in FIG. 6. The ply 242 forms at least part of the airfoil 216 and platform 214 of the blade 210 by extending down from the first end 262, wrapping around the root core 222, and extending along itself back out to the second end 264. The ends 262, 264 of the ply 242 may be bonded together. An intermediate ply 244 may be positioned between portions of the ply 242 to form part of the stem 220, airfoil 216, or both.

An optional wedge 252 may be added between the root core 222, intermediate ply 244, portions of the ply 242 as shown in FIG. 6. In the illustrative embodiment, the wedge 252 is formed from chopped or segmented fibers of ceramic material suspended in a ceramic matrix material. Plies 241, 243 may be bonded to the ply 242 to form an exterior portion of the airfoil 216 and at least part of the platform 214. In one embodiment, the plies 241, 243 are a single ply of material wrapped around the ends of the ply 242.

The plies 246, 248 are arranged in a pentagonal tube shape to form the root core 222 as suggested in FIG. 6. In one embodiment, the plies 246, 248 are rolled sheets with the ply 246 rolled around the ply 248. In another embodiment, the plies 246, 248 are formed as braided tubes where fibers of ceramic material are woven together into the tube shape. An optional filler 254 may be added to the center of the root core 222.

In the illustrative embodiment, the filler 254 is formed from strands of ceramic-containing material aligned to extend along a length of the tubes and suspended in a ceramic matrix material as suggested in FIG. 6. In another embodiment, the filler 254 may be chopped or segmented fibers of ceramic material suspended in a ceramic matrix material. In another embodiment, the filler 254 may be an additional ply of ceramic-containing material continuously rolled onto itself to form a cylinder of ceramic-containing material (sometimes called a jelly roll). The cylinder of ceramic-containing material may be processed to form a pentagonal shape and then positioned within the tubes formed by the plies 246, 248. The additional ply may be bonded with the plies 242, 244, 246, 248 to form part of the composite structure 240.

In another embodiment, the filler 254 may be a monolithic ceramic component. In another embodiment, the filler 254 may comprise fibers of ceramic-containing material woven together to form a 3-dimensional structure. In another embodiment, the filler 254 may be a fully processed ceramic-matrix composite structure. In another embodiment, the filler 254 may comprise ceramic foam that is infiltrated. In another embodiment, the root core 222 may consist solely of the filler 254 in any of the above described alternative forms.

The blade 210 experiences centrifugal loading during rotation of the turbine wheel 200 as suggested in FIG. 6. The forces are distributed through the stem 220 and to the root casing 224. The outer surface 226 of the root casing 224 contacts the blocker walls 205 of the dovetail slot 201 to resist the forces acting on the blade 210 and maintain positioning of the root 212 within the dovetail slot 201. The forces placed on the root casing 224 are transferred at least in part to the root core 222. The tubes formed by the plies 246, 248 distribute the load as hoop stress around the circumference of the tubes to maintain the shape of the root 212.

The plies 241, 243 experience similar centrifugal loading as suggested in FIG. 6. The bond created between the plies 241, 243 and the ply 242 during formation of the composite structure 240 holds the plies 241, 243 to the rest of the blade 210. The centrifugal loading of the blade 210 creates shear stress between the ply 242 and plies 241, 243 along the bonded surfaces.

An optional ply-retaining pin 249 may be positioned through the plies 241, 242, 243, 244 to assist in retaining the plies 241, 243 to the blade 210. A hole is formed through the plies 241, 242, 243, 244 to receive the ply-retaining pin 249. The ply-retaining pin 249 may be formed as a CMC structure prior to being inserted through the blade 210 and integrally joined with the blade 210 through a slurry infiltrate or melt infiltrate process. In one embodiment, the ply-retaining pin 249 is formed from fibers of ceramic-containing material positioned through the plies 241, 242, 243, 244 and aligned perpendicular therewith to be bonded together during formation of the composite structure 240.

In another embodiment, the plies 241, 242, 243, 244 are stitched together prior to formation of the composite structure 240. For example, fibers of ceramic-containing material may pass into one side of the blade 210 and out the other side through the plies 241, 242, 243, 244, and this process may be repeated up and down the blade 210 so that the plies 241, 242, 243, 244 are stitched together. The blade 210 may then be processed into the composite structure 240 and the stitching fibers may assist in retaining the plies 241, 243 to the blade 210.

Another illustrative turbine wheel 300 adapted for use in a gas turbine engine is shown in FIG. 7. The turbine wheel 300 includes a rotor disk 302 (only a portion of which is shown) and a plurality of turbine blades 310 (only one of which is shown). In accordance with the present disclosure, the turbine blades 310 are attached to the rotor disk 302 for rotation with the rotor disk 302 about a central axis of the gas turbine engine. The rotor disk 302 is similar to the rotor disk 202.

The rotor disk 302 illustratively includes a radial surface 308 defining an outer diameter of the rotor disk 302 and a plurality of dovetail slots 301 (only one of which is shown) formed in the rotor disk 302 as shown in FIG. 7. Each dovetail slot 301 extends inwardly in the radial direction from the radial surface 308 of the rotor disk 302. Further, each dovetail slot 301 extends through the rotor disk 302 from a forward side of the rotor disk 302 to an aft side of the rotor disk 302. Each dovetail slot 301 is shaped to form a dovetail shape when viewed from the front or aft sides.

In the illustrative embodiment, the dovetail shape is substantially pentagonal to surround a root 312 of the blade 310 while minimizing space for the root 312 to travel in the dovetail slot 301 as shown in FIG. 7. The dovetail slots 301 are positioned to couple the plurality of blades 310 to the rotor disk 302 to form the turbine wheel 300.

Each blade 310 of the exemplary embodiment is made from a ceramic-matrix composite material adapted to withstand high temperature combustion products discharged onto the blade 310. The blades 310 illustratively comprise silicon-carbide reinforcements suspended in silicon-carbide matrix material. In other embodiments, other reinforcements and other ceramic-containing matrix materials may be included in the blades 310.

Each blade 310 is formed to include a root 312, a platform 314 coupled to the root 312, and an airfoil 316 coupled to the platform 314 as shown in FIG. 7. The airfoil 316 is aerodynamically shaped to interact with gasses moving over the blade 310. The platform 314 connects the root 312 to the airfoil 316 and separates the root 312 from the airfoil 316 so that gasses passing over the airfoil 316 are blocked from moving down around the root 312. In some embodiments, the platform is formed separately from the blade and positioned to surround at least a portion of the blade to block gasses from moving down to the root.

In the illustrative embodiment, the root 312 includes a stem 320 which extends down from the airfoil 316 and the platform 314, a root core 322, and a root casing 324 surrounding the root core 322 and coupled to the stem 320 as shown in FIG. 7. The stem 320 is sized to be received in a radially-facing opening 303 of the dovetail slot 301 such that the root 312 can pass into the dovetail slot 301. Similarly, the root core 322 and root casing 324 are sized to be received in the dovetail slot 301.

The root core 322 and root casing 324 are substantially pentagonal as shown in FIG. 7. However, in other embodiments, the root core and root casing may have other shapes. In the illustrative embodiment, the root casing 324 includes ceramic fiber reinforcements 355 woven or braided to form a tube without an axially extending seam and are suspended in a ceramic matrix material 365.

The dovetail slot 301 of the rotor disk 302 illustratively includes a pair of converging blocker walls 305 forming the radially-facing opening 303 and an inner surface 307 connecting the blocker walls 305 as shown in FIG. 7. The blocker walls 305 are positioned to engage the root casing 324 to retain the root 312 of the blade 310 within the slot 301. The inner surface 307 is sized and shaped to surround the root core 322 and root casing 324. The inner surface 307 may substantially match the outer profile of the root casing 324 in order to assist in retaining the root 312 within the slot 301.

In the illustrative embodiment, the root 312 passes into the dovetail slot 301 of the rotor disk 302 through either the forward or aft end of the dovetail slot 301 as suggested in FIG. 7. An outer surface 326 of the root casing 324 contacts the blocker walls 305 of the dovetail slot 301 to counteract centrifugal forces exerted on the blade 310 during operation of the gas turbine engine. In one illustrative embodiment, the blade 310 is formed from a plurality of plies of ceramic-containing material bonded together with a ceramic matrix material in a composite structure. For example, each ply contains fibers of ceramic material woven together or otherwise arranged to form a sheet.

The plies may be flexible prior to forming the composite structure so that they can be arranged in a mold defining the general shape of the blade 310 and bonded together with the ceramic matrix material that infiltrates the plies and is densified. The bonding process fixes the shape of the plies to form the composite structure. Subsequent machining or processing may occur to refine the shape of the composite structure.

In the illustrative embodiment, a ply 342 forms the root casing 324 and at least a portion of the stem 320 while two plies 346, 348 form at least a portion of the root core 322 as suggested in FIG. 7. The plies 342, 346, 348 are bonded together to form a composite structure 340. Although three plies are shown, more or less plies may be used without departing from the teachings of the present disclosure.

The ply 342 may be a continuous sheet having a first end 362 and a second end 364 as suggested in FIG. 7. The ply 342 forms at least part of the airfoil 316 and platform 314 of the blade 310 by extending down from the first end 362, wrapping around the root core 322, and extending along itself back out to the second end 364.

An optional wedge 352 may be added between the root core 322 and portions of the ply 342 as shown in FIG. 7. In the illustrative embodiment, the wedge 352 is formed from chopped or segmented fibers of ceramic material suspended in a ceramic matrix material. Plies 341, 343 may be bonded to the ply 342 to form an exterior portion of the airfoil 316 and at least part of the platform 314. In one embodiment, the plies 341, 343 are a single ply of material wrapped around the ends of the ply 342.

The plies 346, 348 are arranged in a pentagonal tube shape to form the root core 322 as suggested in FIG. 7. In one embodiment, the plies 346, 348 are rolled sheets with the ply 346 rolled around the ply 348. In another embodiment, the plies 346, 348 are formed as braided tubes where fibers of ceramic material are woven together into the tube shape. An optional filler 354 may be added to the center of the root core 322.

In the illustrative embodiment, the filler 354 is formed from strands of ceramic-containing material aligned to extend along a length of the tubes and suspended in a ceramic matrix material as suggested in FIG. 7. In another embodiment, the filler 354 may be chopped or segmented fibers of ceramic material suspended in a ceramic matrix material. In another embodiment, the filler 354 may be an additional ply of ceramic-containing material continuously rolled onto itself to form a cylinder of ceramic-containing material (sometimes called a jelly roll). The cylinder of ceramic-containing material may be processed to form a pentagonal shape and then positioned within the tubes formed by the plies 346, 348. The additional ply may be bonded with the plies 342, 346, 348 to form part of the composite structure 340.

In another embodiment, the filler 354 may be a monolithic ceramic component. In another embodiment, the filler 354 may comprise fibers of ceramic-containing material woven together to form a 3-dimensional structure. In another embodiment, the filler 354 may be a fully processed ceramic-matrix composite structure. In another embodiment, the filler 354 may comprise ceramic foam that is infiltrated. In another embodiment, the root core 322 may consist solely of the filler 354 in any of the above described alternative forms.

The blade 310 experiences centrifugal loading during rotation of the turbine wheel 300 as suggested in FIG. 7. The forces are distributed through the stem 320 and to the root casing 324. The outer surface 326 of the root casing 324 contacts the blocker walls 305 of the dovetail slot 301 to resist the forces acting on the blade 310 and maintain positioning of the root 312 within the dovetail slot 301. The forces placed on the root casing 324 are transferred at least in part to the root core 322. The tubes formed by the plies 346, 348 distribute the load as hoop stress around the circumference of the tubes to maintain the shape of the root 312.

The plies 341, 343 experience similar centrifugal loading as suggested in FIG. 7. The bond created between the plies 341, 343 and the ply 342 during formation of the composite structure 340 holds the plies 341, 343 to the rest of the blade 310. The centrifugal loading of the blade 310 creates shear stress between the ply 342 and plies 341, 343 along the bonded surfaces. An optional wedge 357 may be positioned between the ends 362, 364 of the ply 342 to form a shoulder 359. The shoulder 359 provides a radially inward resistance force against the plies 341, 343 to counteract the radially outward centrifugal force acting on the plies 341, 343 and assist in retaining the plies 341, 343 to the blade 310.

Ply-retaining pins or stitching may also be used to secure the plies 341, 343 to the blade 310.

Figures 8, 9:
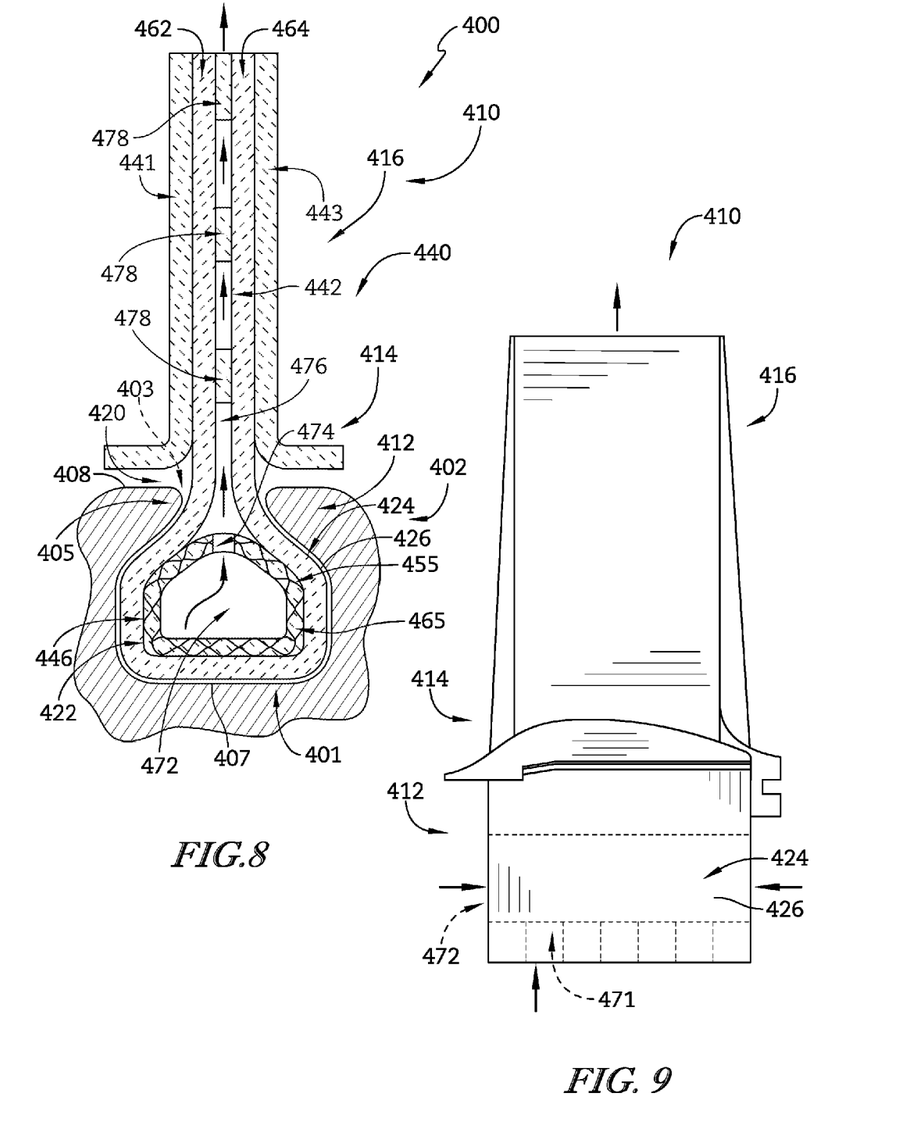
FIG. 8 is cross-sectional view of a fourth turbine wheel showing that a fourth embodiment of a blade in accordance with the present disclosure includes an airfoil, a platform, and a root for attaching the blade to a rotor disk and suggesting that a root core and portions of the blade are hollow to allow cooling air to pass through the blade.
FIG. 9 is a side elevation view of the blade of FIG. 8 suggesting the ends of the root may be open to allow cooling air to pass into the root core or that vents may be formed through a base of the root to allow cooling air to pass into the root core.

Another illustrative turbine wheel 400 adapted for use in a gas turbine engine is shown in FIG. 8. The turbine wheel 400 includes a rotor disk 402 (only a portion of which is shown) and a plurality of turbine blades 410 (only one of which is shown). In accordance with the present disclosure, the turbine blades 410 are attached to the rotor disk 402 for rotation with the rotor disk 402 about a central axis of the gas turbine engine. The rotor disk 402 is similar to the rotor disk 302.

The rotor disk 402 illustratively includes a radial surface 408 defining an outer diameter of the rotor disk 402 and a plurality of dovetail slots 401 (only one of which is shown) formed in the rotor disk 402 as shown in FIG. 8. Each dovetail slot 401 extends inwardly in the radial direction from the radial surface 408 of the rotor disk 402. Further, each dovetail slot 401 extends through the rotor disk 402 from a forward side of the rotor disk 402 to an aft side of the rotor disk 402. Each dovetail slot 401 is shaped to form a dovetail shape when viewed from the front or aft sides.

In the illustrative embodiment, the dovetail shape is substantially pentagonal to surround a root 412 of the blade 410 while minimizing space for the root 412 to travel in the dovetail slot 401 as shown in FIG. 8. The dovetail slots 401 are positioned to couple the plurality of blades 410 to the rotor disk 402 to form the turbine wheel 400.

Each blade 410 of the exemplary embodiment is made from a ceramic-matrix composite material adapted to withstand high temperature combustion products discharged onto the blade 410. The blades 410 illustratively comprise silicon-carbide reinforcements suspended in silicon-carbide matrix material. In other embodiments, other reinforcements and other ceramic-containing matrix materials may be included in the blades 410.

Each blade 410 is formed to include a root 412, a platform 414 coupled to the root 412, and an airfoil 416 coupled to the platform 414 as shown in FIGS. 8 and 9. The airfoil 416 is aerodynamically shaped to interact with gasses moving over the blade 410. The platform 414 connects the root 412 to the airfoil 416 and separates the root 412 from the airfoil 416 so that gasses passing over the airfoil 416 are blocked from moving down around the root 412. In some embodiments, the platform is formed separately from the blade and positioned to surround at least a portion of the blade to block gasses from moving down to the root.

In the illustrative embodiment, the root 412 includes a stem 420 which extends down from the airfoil 416 and the platform 414, a root core 422, and a root casing 424 surrounding the root core 422 and coupled to the stem 420 as shown in FIG. 8. The stem 420 is sized to be received in a radially-facing opening 403 of the dovetail slot 401 such that the root 412 can pass into the dovetail slot 401. Similarly, the root core 422 and root casing 424 are sized to be received in the dovetail slot 401.

The root core 422 and root casing 424 are substantially pentagonal as shown in FIG. 8. However, in other embodiments, the root core and root casing may have other shapes. In the illustrative embodiment, the root casing 424 includes ceramic fiber reinforcements 455 woven or braided to form a tube without an axially extending seam and are suspended in a ceramic matrix material 465.

The dovetail slot 401 of the rotor disk 402 illustratively includes a pair of converging blocker walls 405 forming the radially-facing opening 403 and an inner surface 407 connecting the blocker walls 405 as shown in FIG. 8. The blocker walls 405 are positioned to engage the root casing 424 to retain the root 412 of the blade 410 within the slot 401. The inner surface 407 is sized and shaped to surround the root core 422 and root casing 424. The inner surface 407 may substantially match the outer profile of the root casing 424 in order to assist in retaining the root 412 within the slot 401.

In the illustrative embodiment, the root 412 passes into the dovetail slot 401 of the rotor disk 402 through either the forward or aft end of the dovetail slot 401 as suggested in FIG. 8. An outer surface 426 of the root casing 424 contacts the blocker walls 405 of the dovetail slot 401 to counteract centrifugal forces exerted on the blade 410 during operation of the gas turbine engine. In one illustrative embodiment, the blade 410 is formed from a plurality of plies of ceramic-containing material bonded together with a ceramic matrix material in a composite structure. For example, each ply contains fibers of ceramic material woven together or otherwise arranged to form a sheet.

The plies may be flexible prior to forming the composite structure so that they can be arranged in a mold defining the general shape of the blade 410 and bonded together with the ceramic matrix material that infiltrates the plies and is densified. The bonding process fixes the shape of the plies to form the composite structure. Subsequent machining or processing may occur to refine the shape of the composite structure.

In the illustrative embodiment, a ply 442 forms the root casing 424 and at least a portion of the stem 420 while a ply 446 forms the root core 422 as suggested in FIG. 8. The plies 442, 446 are bonded together to form a composite structure 440. Although two plies are shown, more or less plies may be used without departing from the teachings of the present disclosure.

The ply 442 may be a continuous sheet having a first end 462 and a second end 464 as suggested in FIG. 8. The ply 442 forms at least part of the airfoil 416 and platform 414 of the blade 410 by extending down from the first end 462, wrapping around the root core 422, and extending along itself back out to the second end 464. Plies 441, 443 may be bonded to the ply 442 to form an exterior portion of the airfoil 416 and at least part of the platform 414. In one embodiment, the plies 441, 443 are a single ply of material wrapped around the ends 462, 464 of the ply 442.

The ply 446 is arranged in a pentagonal tube shape to form the root core 422 as suggested in FIG. 8. In one embodiment, the ply 446 is a rolled sheet. In another embodiment, the ply 446 is formed as a braided tube where fibers of ceramic material are woven together into the tube shape.

The blade 410 experiences centrifugal loading during rotation of the turbine wheel 400 as suggested in FIG. 8. The forces are distributed through the stem 420 and to the root casing 424. The outer surface 426 of the root casing 424 contacts the blocker walls 405 of the dovetail slot 401 to resist the forces acting on the blade 410 and maintain positioning of the root 412 within the dovetail slot 401. The forces placed on the root casing 424 are transferred at least in part to the root core 422. The tube formed by the ply 446 distributes the load as hoop stress around the circumference of the tube to maintain the shape of the root 412.

The plies 441, 443 experience similar centrifugal loading as suggested in FIG. 8. The bond created between the plies 441, 443 and the ply 442 during formation of the composite structure 440 holds the plies 441, 443 to the rest of the blade 410. The centrifugal loading of the blade 410 creates shear stress between the ply 442 and plies 441, 443 along the bonded surfaces. Ply-retaining pins or stitching may also be used to secure the plies 441, 443 to the blade 410.

In the illustrative embodiment, a cooling air flow path is formed through the blade 410 as suggested in FIGS. 8 and 9. Cooling air may enter a hollow center 472 of the root core 422 through the forward or aft ends of the root 412. Cooling air may also enter the hollow center 472 through optional entry ports 471 formed through the root casing 424 and root core 422. Cooling air passes out of the hollow core 472 through apertures 474 formed through the root casing 424 and into a cooling channel 476 positioned between the ends 462, 462 of the ply 442. The cooling channel 476 allows the cooling air to pass through the platform 414 and airfoil 416 of the blade 410 thereby cooling the blade 410 during operation of the gas turbine engine. The cooling air may pass out of a tip of the blade 410.

Spacers 478 may be positioned in the cooling channel 476 to tie the ends 462, 464 of the ply 442 together as suggested in FIG. 8. In the illustrative embodiment, the spacers 478 comprise reticulated ceramic foam allowing cooling air to pass through the spaces and through the cooling channel 476. Although three spacers 478 are shown, more or less spacers may be used. For example, the cooling channel 476 may be entirely filled with a single spacer 478. Alternatively, the cooling channel 476 may be free of spacers 478 where the airfoil 416 is hollow.

Figure 10:
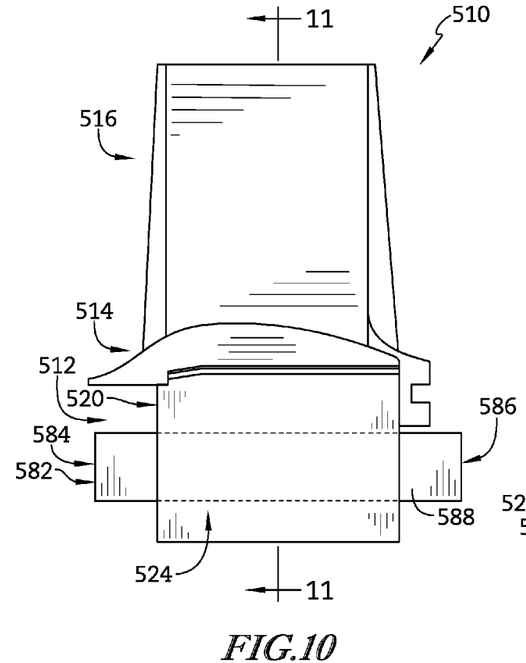
FIG. 10 is a side elevation view of a fifth embodiment of a blade in accordance with the present disclosure showing that the blade includes an airfoil, a platform, and a root and suggesting that a pin is positioned through the root for attaching the blade to a rotor disk.
Figure 11:
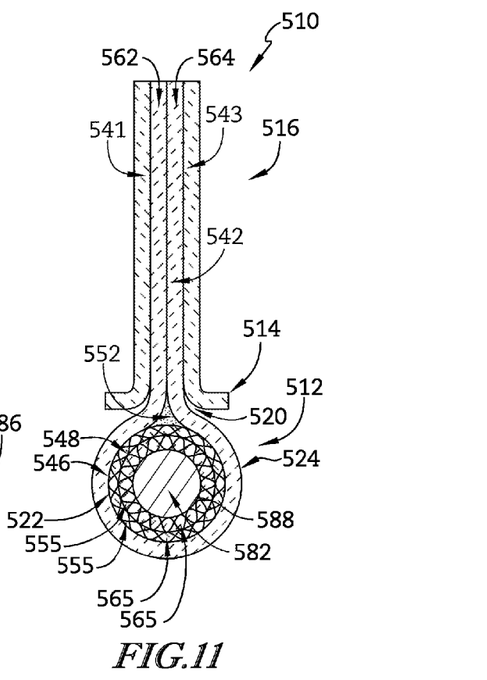
FIG. 11 is a cross-sectional view of the turbine wheel of FIG. 10 showing that one or more plies of ceramic-containing materials extend down from the platform, airfoil, or both and wrap around a cylindrical root core and suggesting that the root core includes one or more tubes of ceramic-containing materials and that the pin is received in the tubes to couple the blade to the rotor disk.

Another illustrative turbine blade 510 in accordance with the present disclosure is illustrated in FIGS. 10 and 11. The turbine blade 510 is adapted for attachment to a rotor disk for rotation with the rotor disk about a central axis of the gas turbine engine. The rotor disk may be similar to the rotor disk 202.

Each blade 510 is made from a ceramic-matrix composite material adapted to withstand high temperature combustion products discharged onto the blade 510. The blade 510 illustratively comprises silicon-carbide reinforcements suspended in silicon-carbide matrix material. In other embodiments, other reinforcements and other ceramic-containing matrix materials may be included in the blade 510.

Each blade 510 is formed to include a root 512, a platform 514 coupled to the root 512, and an airfoil 516 coupled to the platform 514 as shown in FIGS. 10 and 11. The airfoil 516 is aerodynamically shaped to interact with gasses moving over the blade 510. The platform 514 connects the root 512 to the airfoil 516 and separates the root 512 from the airfoil 516 so that gasses passing over the airfoil 516 are blocked from moving down around the root 512. In some embodiments, the platform is formed separately from the blade and positioned to surround at least a portion of the blade to block gasses from moving down to the root.

In the illustrative embodiment, a retention pin 582 passes through the root 512 to secure the blade 510 to the rotor disk as suggested in FIGS. 10 and 11. The retention pin 582 includes a forward end 584, an aft end 586, and a substantially cylindrical outer surface 588. The retention pin 582 may be made from a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the retention pin 582 may comprise a ceramic or composite material in place of a metal or metal alloy. The forward and aft ends 584, 586 of the retention pin 582 cooperate with features of the rotor disk to hold the blade 510 to the rotor disk.

The root 512 includes a stem 520 which extends down from the airfoil 516 and the platform 514, a root core 522, and a root casing 524 surrounding the root core 522 and coupled to the stem 520 as shown in FIG. 11. The root core 522 and root casing 524 are substantially cylindrical. However, in other embodiments, the root core and root casing may have other shapes. In the illustrative embodiment, the root casing 524 includes ceramic fiber reinforcements 555 woven or braided to form a tube without an axially extending seam and are suspended in a ceramic matrix material 565.

In one illustrative embodiment, the blade 510 is formed from a plurality of plies of ceramic-containing material bonded together with a ceramic matrix material in a composite structure. For example, each ply contains fibers of ceramic material woven together or otherwise arranged to form a sheet. The plies may be flexible prior to forming the composite structure so that they can be arranged in a mold defining the general shape of the blade 510 and bonded together with the ceramic matrix material that infiltrates the plies and is densified. The bonding process fixes the shape of the plies to form the composite structure. Subsequent machining or processing may occur to refine the shape of the composite structure.

In the illustrative embodiment, a ply 542 forms the root casing 524 and at least a portion of the stem 520 while two plies 546, 548 form at least a portion of the root core 522 as suggested in FIG. 11. The plies 542, 546, 548 are bonded together to form a composite structure 540. Although three plies are shown, more or less plies may be used without departing from the teachings of the present disclosure.

The ply 542 may be a continuous sheet having a first end 562 and a second end 564 as suggested in FIG. 11. The ply 542 forms at least part of the airfoil 516 and platform 514 of the blade 510 by extending down from the first end 562, wrapping around the root core 522, and extending along itself back out to the second end 564. Plies 541, 543 may be bonded to the ply 542 to form an exterior portion of the airfoil 516 and at least part of the platform 514. In one embodiment, the plies 541, 543 are a single ply of material wrapped around the ends 562, 564 of the ply 542.

The plies 546, 548 are arranged in a rounded tube shape to form the root core 522 as suggested in FIG. 11. In one embodiment, the plies 546, 548 are rolled sheets with the ply 546 rolled around the ply 548. In another embodiment, the plies 546, 548 are formed as braided tubes where fibers of ceramic material are woven together into the tube shape. An optional wedge 552 may be added between the root core 522 and mating portions of the ply 542. The wedge 552 may be formed from chopped or segmented fibers of ceramic material suspended in a ceramic matrix material.

In the illustrative embodiment, the retention pin 582 passes through the tubes formed by the plies 546, 548 such that the outer surface 588 of the retention pin 582 is engaged with the ply 548 as suggested in FIG. 11. Centrifugal forces exerted on the blade 510 during operation of the gas turbine engine are transferred by the stem 520 through the root 512 and to the rotor disk by way of the retention pin 582.

Figure 12:
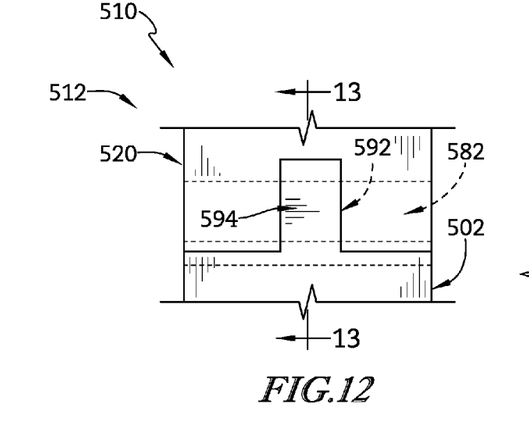
FIG. 12 is a partial side elevation view of a sixth embodiment of a blade in accordance with the present disclosure suggesting that a pin is positioned through a root of the blade and a flange of a rotor disk for attaching the blade to the rotor disk.
Figure 13:
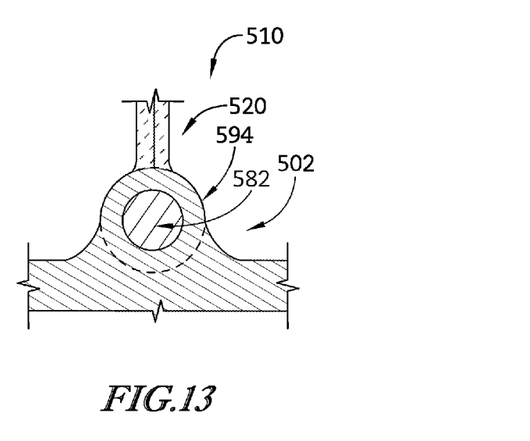
FIG. 13 is a cross-sectional view of the blade of FIG. 12 suggesting that the root of the blade is aligned with the flange of the rotor disk and the pin is positioned to extend through the root and flange to couple the blade to the rotor disk.

In an alternative embodiment, a central portion of the retention pin 582 may be used to secure the blade 510 to a rotor disk 502 as suggested in FIGS. 12 and 13. A slot 592 may be cut across the root 512 for receiving a flange 594 of the rotor disk 502. The retention pin 582 passes through the root 512 and flange 594 to secure the blade 510 to the rotor disk 502.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel for a gas turbine engine, the turbine wheel comprising
a disk formed to include a dovetail slot that extends through the disk in an axial direction from a forward side to an aft side of the disk and inwardly in a radial direction from an outer diameter of the disk toward a central axis, and
a blade comprising ceramic-matrix materials, the blade formed to include an airfoil that extends outwardly in the radial direction from the outer diameter of the disk and a root that extends into the dovetail slot,
wherein the root includes a stem that extends from the airfoil into the dovetail slot, a root core, and a root casing that extends from the stem around the root core to couple the root core to the stem, the root casing comprising ceramic-matrix materials and positioned to engage an inner surface of the dovetail slot formed by the disk to retain the blade in place relative to the disk during rotation of the disk,
wherein portions of the airfoil and root casing are formed by at least one continuous ply of ceramic-containing material having a first end forming a portion of the airfoil and extending radially inward from the airfoil to wrap around the root core and extending along itself back radially outward to a second end also forming a portion of the airfoil.

2. The turbine wheel of claim 1, wherein the dovetail slot includes a pair of blocker walls defining a radially-facing opening extending through the outer diameter of the disk into the dovetail slot and the inner surface, and wherein the inner surface connects the blocker walls.

3. The turbine wheel of claim 2, wherein the root of the blade has a substantially cylindrical outer profile and the inner surface of the dovetail slot substantially matches the outer profile of the root.

4. The turbine wheel of claim 2, wherein the root of the blade has a substantially pentagonal outer profile and the inner surface of the dovetail slot substantially matches the outer profile of the root.

5. The turbine wheel of claim 1, wherein wherein the continuous ply of ceramic-containing material forms at least part of the airfoil and at least part of the root by extending radially inward from the first end, wrapping around the root core, and extending along itself back radially outward to the second end such that the first and second ends are adjacent to one another.

6. The turbine wheel of claim 1, wherein the blade further includes a cooling channel extending from the root core radially outward through the airfoil such that at least a portion of the airfoil is hollow to allow cooling air to pass through the root core, through the blade, and out of a tip of the airfoil.

7. A turbine wheel for a gas turbine engine, the turbine wheel comprising
a disk formed to include a dovetail slot that extends through the disk in an axial direction from a forward side to an aft side of the disk and inwardly in a radial direction from an outer diameter of the disk toward a central axis, and
a blade formed to include an airfoil that extends outwardly in the radial direction from the outer diameter of the disk and a root that extends into the dovetail slot, the airfoil and root being formed as a composite structure, the root including a stem that extends from the airfoil into the dovetail slot, a root core comprising ceramic-matrix material, and a root casing that extends from the stem around the root core to couple the root core to the stem, the root casing comprising ceramic-matrix materials and positioned to engage an inner surface of the dovetail slot formed by the disk to retain the blade in place relative to the disk during rotation of the disk,
wherein the root core includes at least one tube formed from woven ceramic-containing fibers without an axially extending seam,
wherein at least one continuous ply of ceramic-containing material includes a first end and a second end, and wherein the continuous ply of ceramic-containing material forms at least part of the airfoil and at least part of the root by extending radially inward from the first end, wrapping around the root core, and extending along itself back radially outward to the second end forming at least a part of the airfoil.

8. The turbine wheel of claim 7, wherein the root core further includes a filler positioned within the at least one tube.

9. The turbine wheel of claim 8, wherein the filler comprises a plurality of ceramic-containing fibers aligned with one another along a length of the one or more tubes and suspended in a ceramic matrix material.

10. The turbine wheel of claim 8, wherein the filler comprises a ply of ceramic-containing material continuously rolled onto itself to form a cylinder of ceramic-containing material.

11. The turbine wheel of claim 8, wherein the filler comprises an infiltrated ceramic foam.

12. The turbine wheel of claim 7, wherein the continuous ply of ceramic-containing material forms at least part of the airfoil and at least part of the root by extending radially inward from the first end, wrapping around the root core, and extending along itself back radially outward to the second end such that the first and second ends are adjacent to one another.

13. The turbine wheel of claim 12, wherein the blade further includes a cooling channel positioned between the first and second ends of the at least on continuous ply and extending from the root core radially outward through the airfoil such that at least a portion of the airfoil is hollow to allow cooling air to pass through the root core, through the blade, and out of a tip of the airfoil.

14. The turbine wheel of claim 13, further including at least one aperture formed through the one or more tubes forming the root core and extending from a hollow interior of the one or more tubes to the cooling channel.

15. The turbine wheel of claim 14, further including ports formed through the root casing and root core extending from an exterior of the root casing to the hollow interior of the one or more tubes forming the root core.

16. The turbine wheel of claim 13, further including one or more spacers positioned between the first and second ends of the at least one continuous ply of ceramic-containing material.

17. The turbine wheel of claim 16, wherein the one or more spacers comprise reticulated ceramic foam.

18. A method of making a turbine wheel, the method comprising
positioning a root of a composite blade in a dovetail slot of a rotor disk such that a root casing of the root is positioned to engage an inner surface of the dovetail slot formed by the disk to retain the blade in place relative to the disk during rotation of the disk, wherein the root includes a stem that extends from the airfoil into the dovetail slot, a root core, and the root casing, the root casing comprising ceramic-matrix materials and extending from the stem around the root core to couple the root core to the stem, bonding together plies of ceramic-containing material into a ceramic structure, wherein at least one of the plies forms at least part of the airfoil and at least part of the root casing by extending radially inward from a first end, wrapping around the root core, and extending along itself back radially outward to a second end.

19. The method of claim 18, further comprising forming the composite blade wherein the root core includes at least one tube formed from at least one of the other plies, and the first and second ends are adjacent to one another.

* * * * *